United States Patent [19]

Spies

[11] Patent Number: 5,009,506
[45] Date of Patent: Apr. 23, 1991

[54] PHOTOELECTRIC POSITION-MEASURING ARRANGEMENT HAVING A PLURALITY OF SHIFTABLE GRIDS

[75] Inventor: Alfons Spies, Seebruck, Fed. Rep. of Germany

[73] Assignee: Dr. Johannes Heidenhain GmbH, Traureut, Fed. Rep. of Germany

[21] Appl. No.: 327,300

[22] Filed: Mar. 22, 1989

[30] Foreign Application Priority Data

Mar. 25, 1988 [DE] Fed. Rep. of Germany ....... 3810165

[51] Int. Cl.$^5$ .............................................. G01B 9/02
[52] U.S. Cl. ................................ 356/356; 250/237 G
[58] Field of Search .............................. 356/356, 358; 250/237 G, 231.16

[56] References Cited

U.S. PATENT DOCUMENTS 3,738,753 6/1973 Huntley ......................... 250/237 G
4,776,701 10/1988 Pettigrew ............................ 356/356

FOREIGN PATENT DOCUMENTS 0163362 12/1985 European Pat. Off. .
2146310 9/1971 Fed. Rep. of Germany .
2431551 2/1976 Fed. Rep. of Germany .

Primary Examiner—Samuel Turner
Attorney, Agent, or Firm—Willian Brinks Olds Hofer Gilson & Lione

[57] ABSTRACT

A position measuring arrangement is disclosed which comprises a three-grid measuring system. A first grid is illuminated under an angle $\alpha$. Two partial beams result from diffraction on the first grid. the two partial beams impinge on a second grid, which may be the scale of the position-measuring arrangement. Diffraction of the partial-beams on the second grid result in four partial-beams of which the two partial-beams lying closest to the grid normal impinge upon a third grid. The third grid again diffracts the partial-beams and brings them into interference. The partial-beams which are intensity-modulated by interference by the third grid impinge upon photodetectors, by which they are transformed into phase-shifted electric signals and fed to and evaluated arrangement.

9 Claims, 1 Drawing Sheet

PHOTOELECTRIC POSITION-MEASURING ARRANGEMENT HAVING A PLURALITY OF SHIFTABLE GRIDS

BACKGROUND OF THE INVENTION

The present invention relates generally to a photoelectric position-measuring arrangement and more particularly to a photoelectric position-measuring arrangement which includes a plurality of shiftable grids to diffract light from a light source and bring the diffracted partial-beams into interference such that intensity modulations arising through the interference of the partial-beams are transduced by photo-detectors into electrically signals.

Three-grid measuring arrangements are known in the art. For example, DE-C2-24 31 551 discloses a three-grid arrangement, which includes three transparent grids or gratings which are successively penetrated by light incident thereon. This reference further discloses a second arrangement wherein the system consist of only two grids, one which is transparent and the second which is constructed as a reflection grid. In the systems described in this reference, the grid constant of the grids used cannot be smaller than the wavelength of the light used. Therefore, the resolution of the measuring system is limited.

Another three-grid measuring system is disclosed in EP-A1-163 362. The phase grids disclosed in this reference are configured, with respect to the phase stroke and scanning ratio (strip/furrow ratio), such that three light beams result which undergo intensity modulations and which are phase displaced relative to one another (preferably by 120°). The grid constant in this arrangement also cannot be smaller than the wavelength of the incident light.

DE-A1-21 46 310 discloses the so-called two-grid measuring system. In this two-grid measuring system, the grid constants of the grids used are smaller than the wavelength of the incoming light. A theoretical disadvantage, however, of such interferometric two-grid measuring system is that they are sensitive to fluctuations of the grid spacings and are dependent on the spatial coherence of the light which is used.

Therefore, it is a primary object of the present invention to provide a position-measuring arrangement which effectively uses three grids which are interferometrically scanned and which also permits the use of grid constants that are smaller than the wavelength of the light used.

It is a further object of the present invention to provide a position-measuring arrangement which effectively uses three grids wherein the scanning signals are free of harmonics.

SUMMARY OF THE INVENTION

To achieve the foregoing and other objects and in accordance with the purposes of the present invention, the photoelectric position-measuring arrangement of the present invention provides an arrangement for measuring lengths or angles using the transillumination or direct light principle. The arrangement includes a plurality of grids which are shiftable with respect to one another and which diffract light coming from a light source. The grids further bring the diffracted partial-beam into interference such that the intensity modulations arising through the interference of the partial-beams are transduced by photodetectors into electrical signals which are phased-shifted relative to one another. The light coming from the light source enters the first grid at an incidence angle relative to the grid normal. The grid is configured and the incidence angle is selected such that only the partial-beam of the zero diffraction order and the partial-beam of the first diffraction order lying closest to the grid normal contribute to the signal formation by diffraction at a second grid and such that the zero order partial-beam and the first diffraction order partial-beam obtain a constant phase displacement by an amount $\theta$. The second grid being configured such that the incident partial-beams are resolved only into partial-beams of their first orders of diffraction and such that the partial-beams lying closest to the grid normal are brought into interference by diffraction on a third grid. The third grid is configured identically to the first grid. The interfering partial-beams from the third grid impinge upon photodetectors.

DETAILED DESCRIPTION OF THE DRAWINGS PRESENTLY PREFERRED EMBODIMENTS

Figure 1:
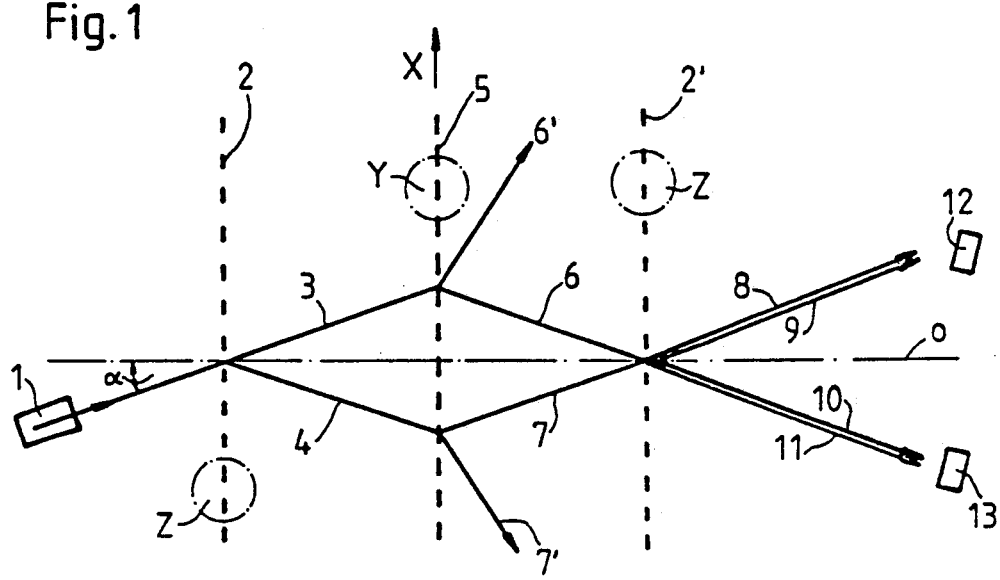
FIG. 1 illustrates a preferred embodiment of the present invention using a transillumination arrangement.

Referring now to the figures and specifically to FIG. 1, a transillumination arrangement wherein a phase grid 2 is illuminated at an angle $\alpha$ relative to the grid normal 0 by a light source 1 which preferably emits narrow-band light. The light source may be, for example, a semiconductor laser diode with a collimator engaged on the outlet side which generates an even wave field.

Figure 2:
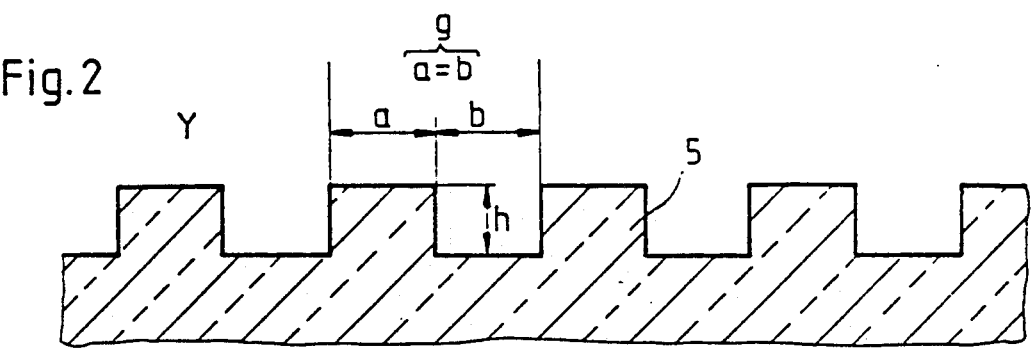
FIG. 2 is an enlarged sectional view of a preferred embodiment of a first phase grid.

The angle $\alpha$ is determined according to the formula $\sin \alpha = \tau/2g$, wherein $\tau$ is the wavelength of the light used and g is the grid constant. Two partial-beams 3 and 4 result behind the phase grid 2. The partial-beams 3 and 4 have "0" and "1" diffraction orders, respectively. These partial-beams 3 and 4 impinge on a second grid 5 which is also preferably constructed as a phase grid. The grid 5 is configured such that no zero order diffraction arises. This preferred arrangement may be implemented in a known manner by the proper configuration of the surface of the grid 5. For example, in a grid with a rectangular profile, the step height, which corresponds to the variation of the phase stroke, may be varied as illustrated in FIG. 2. Preferably, the grid constants g of the grids 2 and 2' as well as 5 are smaller than the wavelength &. Accordingly, there arises no diffraction orders with an order number greater than "1". Four partial-beams 6, 6', 7, 7' result from the diffraction of the partial beams 3 and 4 by the second grid 5. Of the four partial-beams, only the partial-beams 6 and 7 which are diffracted toward a third grid 2', which is preferably configured identically to the first grid 2 and is disposed such that the partial-beams 6 and 7 impinge on it. The partial-beams 6 and 7 are diffracted by this grid 2'. Therefore, four diffracted partial-beams 8, 9, 10, and 11 result behind the grid 2'. Partial beams 8 and 9 have the same direction and similarly, partial-beams 10 and 11 have the same direction. Accordingly, the partial-beams having the same direction interfere with one another.

Displacement of the grid 5 by an amount x with respect to the grids 2 and 2' results in a phase displacement of the partial-beams 6 and 7 of $\Phi=2\pi x/g$ and $\Phi=-2\pi x/g$ respectively.

The first, second, and third grids may all have equal grid constants.

The grids 2 and 2' are preferably disposed such that a beam will be diffracted into partial-beams of the zero and first order and the partial-beams will have a constant phase displacement of an amount $\theta$. Therefore, the phase of the partial-beams 3 and 4 lags one another by the amount $\theta$. Similarly, the partial beams 8 and 10 resulting from the partial-beam 6 on the grid 2' and the partial beams 9 and 11 resulting from the partial-beam 7 have a similar phase displacement.

Figure 3:
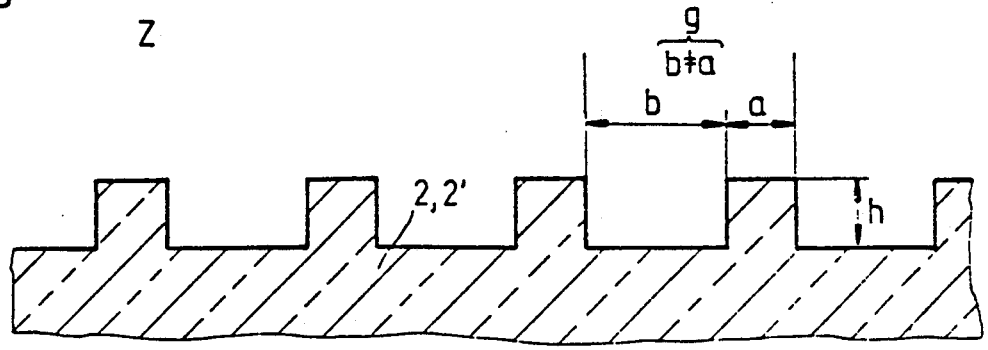
FIG. 3 is an enlarged sectional view of a second preferred embodiment of a second phase grid.

The above described phase displacement $\theta$ is achieved by a preferred configuration of the grids 2 and 2'. One possible embodiment is disclosed in EP-A1-163 362. This preferred configuration disclosed in this reference consists (in the case of a grid with a rectangular profile) of a strip-to-furrow ratio (scanning ratio) a:b substantially different from a 1:1 ratio and the step height h, is such that; the grid has a phase stroke clearly different from $\pi$ radians. Such a configuration is illustrated in FIG. 3 and may be used for the first and third grids 2 and 2', respectively. The second grid 5 may be configured as illustrated in FIG. 2 such that the phase stroke of the second grid 5 is equal to $\pi$ radians.

The interfering partial beams 8 and 9, and 10 and 11, impinge upon photoelectric elements 12 and 13, respectively and are transduced into electrical signals which are then evaluated in incremental position-measuring arrangements in a known manner.

The signals can be described by the following formulas:

For the photoelectric element 12, $$I\,12 = K(1-\cos(2.2\pi x/g)); \text{and}$$

for the photoelectric element 13

$$I\,13 = K(1-\cos(2((2\pi x/g)-\theta)));$$

where K is a consistent, x designates the displacement of the grids 2, 2' and 5 relative to one another, and $\theta$ represents the above described phase displacement.

In one preferred embodiment of the measuring arrangement described above, the measuring arrangement may be of the transillumination type wherein the first, second, and third grids are transparent According to the example described above it is also possible to realize a position-measuring arrangement which utilizes the direct-light principal. The grid 5 in this embodiment is constructed as a reflection grid and the grids 2 and 2' are physically identical and are reflecting grids. FIG. 1 in this case would be illustrative of a "developed" representation.

In a preferred embodiment the second grids comprises the scale of an incremental measuring arrangement and the first and third grids 2 and 2', respectively are scanning grids.

The position-measuring arrangement of the present invention thus provides several advantages over the prior art systems described in the Background of The Invention. With the present invention, a high resolution is achieved without subsequent interpolation, the spacing of the grids relative to one another may fluctuate within wide limits without the signals being disadvantageously influenced. Further, only a slight demand is placed on the spatial coherence of the light source.

Moreover, the signals arising from the photoelectric elements are free of harmonics, since they result from interference of only two partial beams. Therefore, optimal evaluation of these signals is assured.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. It is intended that the scope of the invention be defined by the following claims, including all equivalents.

I claim:

1. A photoelectric position-measuring arrangement for measuring length or angles which includes first, second and third grids which are shiftable with respect to one another, which grids diffract the light eminating from a light source into partial-beams and bring the diffracted partial-beams into interference wherein the intensity modulations arising from the interference from the partial-beams are transduced by photodetectors into electrical signals which are phase shifted with respect to one another, wherein the improvement comprises:

a first grid, a second grid, and a third grid, the first grid disposed such that light from the light source impinges the first grid at an angle $\alpha$ relative to the grid normal (0) and is diffracted by the first grid, the second grid disposed to receive the partial-beams diffracted by the first grid, the third grid disposed to receive partial-beams diffracted by the second grid;

the first grid being configured such that only the partial-beam of the zero diffraction order and the partial-beam of the first diffraction order lying closest to the grid normal (0) are diffracted at the second grid, whereby only these two beams contribute to the signal formation, and the first grid being further configured such that the partial-beams obtain a constant phase displacement of an amount $\theta$;

the second grid being configured such the partial-beams incident thereon are resolved only into partial-beams of their first diffraction orders, the second grid being further configured such that the partial-beams lying closest to the grid normal (0) are brought into interference by diffraction on the third grid;

the third grid being identically configured to the first grid; and the photodetectors being disposed such that the interfering partial-beams from the third grid impinge thereon.

2. The measuring arrangement according to claim 1 wherein the incident angle $\alpha$ is such that the condition $\alpha = \arcsin(\tau/2g)$ is fulfilled.

3. The measuring arrangement according to claim 1 wherein the grid constants of the first, second and, third grids are less than the wavelength of the light of the light source.

4. The measuring arrangement according to claim 1 wherein the grid constants of the first, second, and third grids are equal.

5. The measuring arrangement according to claim 1 wherein the strip-to-furrow ratio of the first and the third grids deviates substantially from a 1:1 ratio, and wherein the ratio of the second grid is a 1:1 ratio such that the phase stroke of the first and third grids deviate substantially from $\pi$ radians and the phase stroke of the second grid is equal $\pi$ radians.

6. The measuring arrangement according to claim 1 wherein the first and third grids define scanning grids and wherein the second grid comprises the scale of an incremental measuring arrangement.

7. The measuring arrangement according to claim 6 is a transillumination measuring arrangement wherein the first, second, and third grids are transparent grids.

8. The measuring arrangement according to claim 6 wherein the first and third grids are transparent and physically identical and wherein the second grid is a reflecting grid.

9. The measuring arrangement according to claim 1 wherein the light source is a semiconductor laser diode including a collimator engaged on the outlet side wherein an even wave field is generated.

* * * * *